(12) United States Patent
Dickson et al.

(10) Patent No.: US 12,077,095 B2
(45) Date of Patent: Sep. 3, 2024

(54) LIGHT ASSEMBLY, REARVIEW DEVICE AND VEHICLE

(71) Applicant: MOTHERSON INNOVATIONS COMPANY LIMITED, London (GB)

(72) Inventors: James N. Dickson, Lonsdale (AU); Paul Home, Lonsdale (AU); Tom Willis, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/044,256

(22) PCT Filed: Sep. 9, 2021

(86) PCT No.: PCT/EP2021/074777
§ 371 (c)(1),
(2) Date: Mar. 7, 2023

(87) PCT Pub. No.: WO2022/063589
PCT Pub. Date: Mar. 31, 2022

(65) Prior Publication Data
US 2023/0311767 A1    Oct. 5, 2023

Related U.S. Application Data

(60) Provisional application No. 63/082,709, filed on Sep. 24, 2020.

(51) Int. Cl.
*B60Q 1/26* (2006.01)
*B60Q 1/24* (2006.01)
(Continued)

(52) U.S. Cl.
CPC .......... *B60Q 1/2607* (2013.01); *B60Q 1/247* (2022.05); *B60Q 1/2665* (2013.01); *B60R 1/006* (2013.01);
(Continued)

(58) Field of Classification Search
CPC .... B60Q 1/2665; B60Q 1/2607; B60Q 1/247; B60Q 1/1207; F21W 2103/25
See application file for complete search history.

(56) References Cited

U.S. PATENT DOCUMENTS 5,497,306 A    3/1996  Pastrick
7,524,092 B2*  4/2009  Rodriguez Barros ......................
                                                B60Q 1/2665
                                                     362/540
(Continued)

FOREIGN PATENT DOCUMENTS

DE    20011341    9/2000
EP    1304260     4/2003
(Continued)

OTHER PUBLICATIONS

Patent Cooperation Treaty, PCT/EP2021/074777, International Search Report and Written Opinion, Nov. 22, 2021.

*Primary Examiner* — Julie A Bannan
(74) *Attorney, Agent, or Firm* — Jones Day

(57) ABSTRACT

The present invention relates to a light assembly for a vehicle comprising: a housing; a lens covering the housing; a plurality of light sources arranged in the housing; wherein the plurality of light sources comprises at least one first light source, at least one second light source and at least one third light source; and a reflector body mounted in the housing; wherein the reflector body comprises a reflector element and different zones for each of the at least one light sources; wherein light emitted by the at least one first light source is captured by the reflector element which reflects the light towards the lens, the lens directing the light generally downward towards the ground area when the light assembly is attached to the vehicle, light emitted by the at least one second light source is passed through an aperture in the reflector body without reflection of the emitted light, and (Continued)

light emitted from the at least one third light source is captured by the reflector body which reflects and directs the light, in particular, horizontally towards the lens, with the lens in particular directing the light generally horizontal, and a light collector is located between the reflector body and the housing; wherein the light collector captures and transmits the light emitted from at least one of the at least one light sources, a rear view device and a vehicle with at least one light assembly.

39 Claims, 21 Drawing Sheets

(51) Int. Cl.
*B60R 1/00* (2022.01)
*B60R 1/12* (2006.01)
*F21S 43/14* (2018.01)
*F21S 43/20* (2018.01)
*F21S 43/249* (2018.01)
*F21S 43/27* (2018.01)
*F21S 43/31* (2018.01)
*F21S 43/40* (2018.01)
*F21S 43/50* (2018.01)
*F21S 45/50* (2018.01)
*B60Q 1/34* (2006.01)
*F21W 103/25* (2018.01)
*F21W 103/30* (2018.01)
*F21Y 115/10* (2016.01)

(52) U.S. Cl.
CPC ............ *B60R 1/1207* (2013.01); *F21S 43/14* (2018.01); *F21S 43/249* (2018.01); *F21S 43/26* (2018.01); *F21S 43/27* (2018.01); *F21S 43/31* (2018.01); *F21S 43/40* (2018.01); *F21S 43/50* (2018.01); *F21S 45/50* (2018.01); *B60Q 1/34* (2013.01); *B60Q 2400/20* (2013.01); *B60Q 2900/50* (2022.05); *F21W 2103/25* (2018.01); *F21W 2103/30* (2018.01); *F21Y 2115/10* (2016.08)

(56) References Cited

U.S. PATENT DOCUMENTS

| | | | |
|---|---|---|---|
| 2001/0010633 A1* | 8/2001 | Apfelbeck | B60Q 1/2665 362/540 |
| 2014/0198515 A1* | 7/2014 | Tulio | B60R 1/1207 362/520 |
| 2019/0106058 A1* | 4/2019 | Salter | B60Q 1/2665 |
| 2019/0202347 A1* | 7/2019 | Salter | B60Q 1/543 |

FOREIGN PATENT DOCUMENTS

| | | | | |
|---|---|---|---|---|
| EP | 1712417 | | 10/2006 | |
| FR | 0230834 | * | 8/1987 | ............. F21S 43/30 |
| WO | WO 2016/067175 | | 5/2016 | |

* cited by examiner

LIGHT ASSEMBLY, REARVIEW DEVICE AND VEHICLE

CROSS-REFERENCE TO RELATED APPLICATIONS

This application is a is a National Stage Entry of International Patent Application No. PCT/EP2021/074777, filed on Sep. 9, 2021, which claims the benefit of priority to U.S. Provisional Application No. 63/082,709, filed on Sep. 24, 2020, each of which is hereby incorporated by reference in its entirety for all purposes.

FIELD OF THE INVENTION

The present disclosure relates generally to a light assembly for a vehicle, in particular for a rearview device of a motor vehicle, according to the pre-amble of claim 1. It also relates to a rearview device with such a light assembly and a motor vehicle with such a rearview device.

BACKGROUND

The statements in this section merely provide background information related to the present disclosure and may not constitute prior art.

Vehicles, such as passenger cars, vans and trucks, typically include rear view mirror assemblies. These assemblies are increasingly including light assemblies to provide various lighting function for the vehicle such as security lights, running lights, puddle lights, turn signal lights, and spotlights. This lighting functions packaged in a single light module are often used for driver notification and for security and safety functions. Packaging multiple lighting functions in a mirror assembly can create difficulty in utilizing a mirror design across different countries with different government regulations on the type and color of each light function. In some cases it is desirable to have the light functions differ across countries. Due to government regulations, light emitting from the mirror assembly is required to maintain the desired color for all light associated with a given operation. When the operations vary from product line to product line, communizing one light source in a multi-functional light module becomes more challenging. It is desirable to develop a system where the light system could be communized and the light emitted be modified to meet regulations.

It is the object of this invention to further develop the known light assembly to overcome at least some of the problems of the prior art as stated above.

SUMMARY

The object is achieved by the features of the characterizing portion of claim 1. The sub-claims describe embodiments according to the present disclosure.

It should be noted that the features set out individually in the following description can be combined with each other in any technically advantageous manner and set out other forms of the present disclosure. The description further characterizes and specifies the present disclosure in particular in connection with the Figures.

DRAWINGS

In order that the disclosure may be well understood, there will now be described various forms thereof, given by way of example, reference being made to the accompanying drawings, in which.

DETAILED DESCRIPTION

Figure 1:
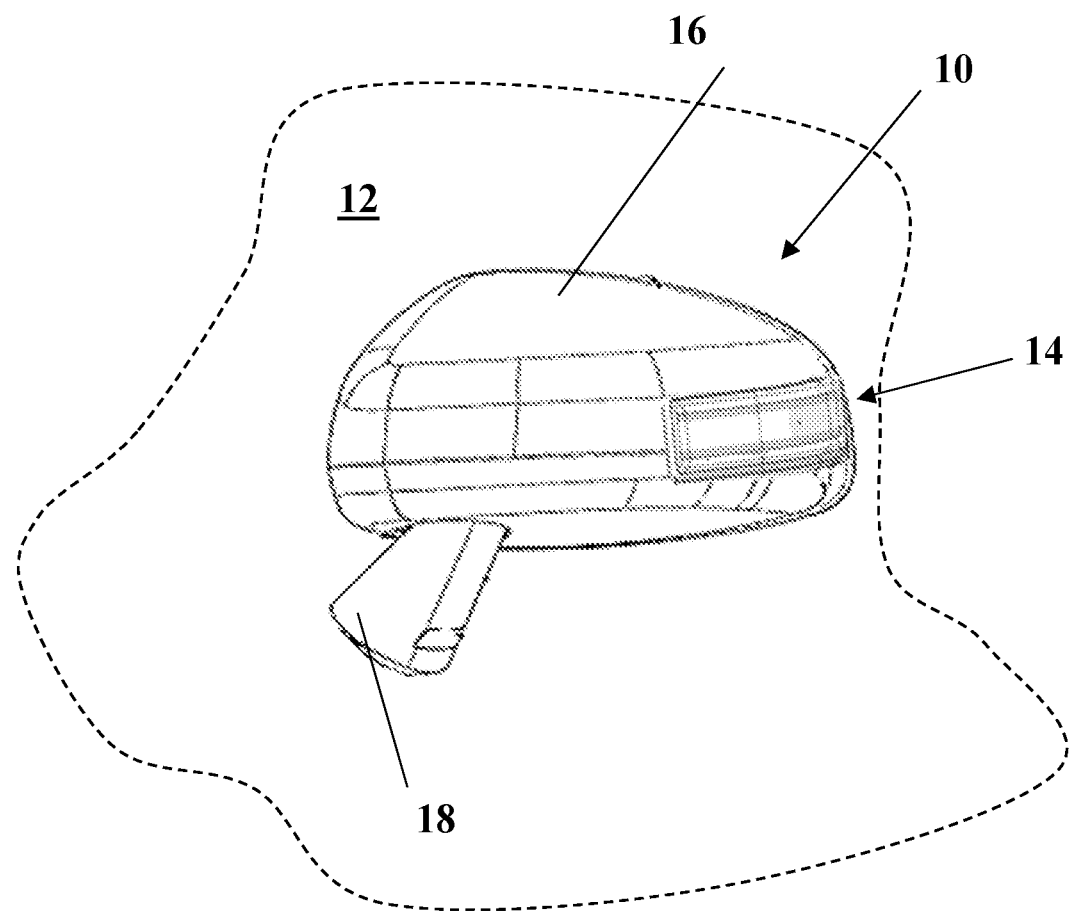
FIG. 1 illustrates an exemplary perspective view of an exterior rearview mirror assembly including a light assembly according to the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates an exemplary perspective view of a rearview device in form of an exterior rearview mirror assembly 10 including a light assembly 14. The exterior rearview mirror assembly 10 further includes a mirror head 16 and a mirror base 18 and is mounted on a vehicle surface 12. The mirror head 16 is adapted to carry at least a reflective element (not shown). In addition it can carry at least one camera. In an alternative, the rearview device is in form of a camera pod with a camera head carrying at least one camera.

The rearview mirror assembly 10 in FIG. 1 is mounted to an A-pillar but may be mounted in any location on a motor vehicle within the scope of this disclosure. The rearview mirror assembly 10 may also have other functions including powerfolding capability, breakaway capability, telescoping capability and other light assemblies mounted on the mirror head 16 or the mirror base 18.

Figure 2:
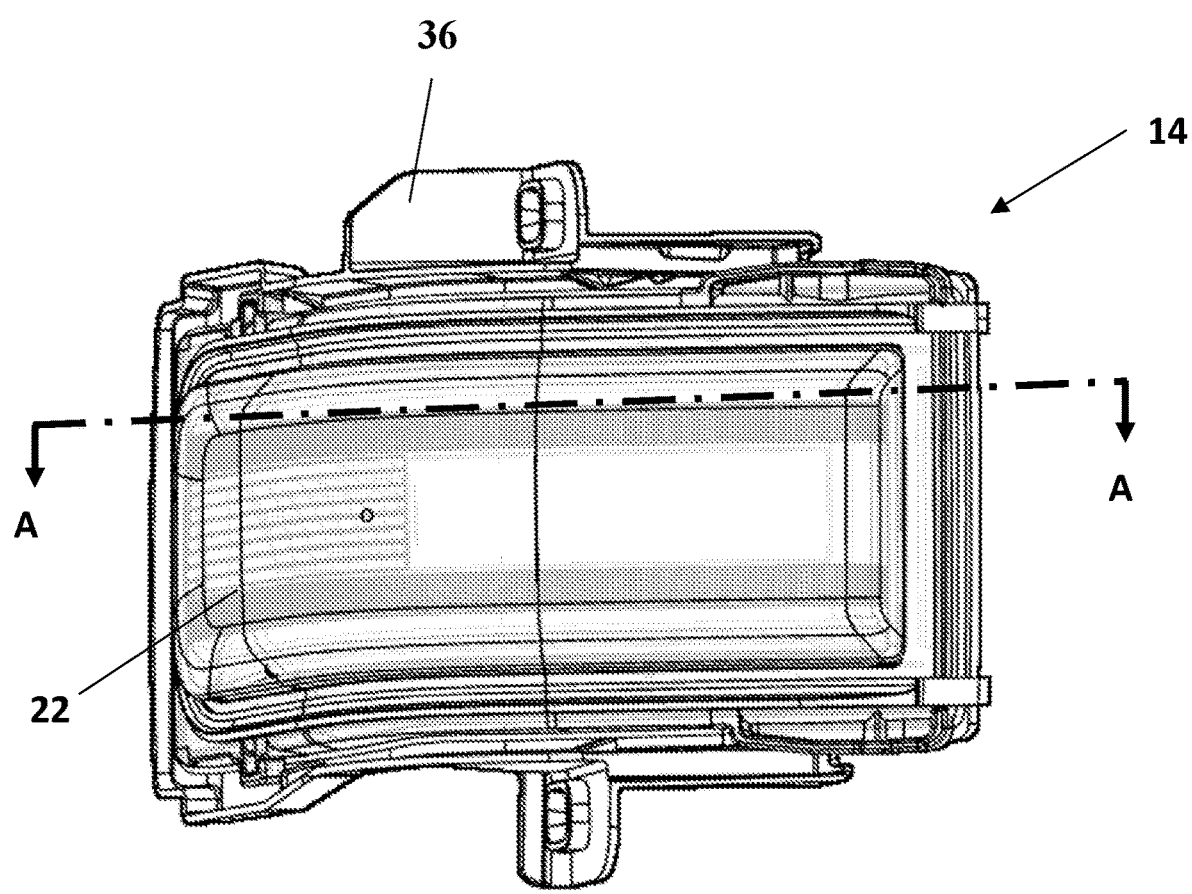
FIG. 2 illustrates a front perspective view of the light assembly according to the present disclosure.

FIG. 2 is a perspective view of the light assembly 14. The light assembly 14 has a lens 22 which may contain optics to direct or modify a light source mounted behind the lens 22. A housing 36 is used to mount the components of the light assembly 14 and provide a mounting arrangement for fastening the light assembly 14 to the mirror head 16. The lens 22 is connected or joined to the housing 36 (e.g. by welding, adhesive, or other known fastening method) and has an inner surface 92 (FIG. 15) and an outer surface 94 (FIG. 15) which provides a viewing surface that is illuminated by the light assembly 14 in use. A section line A-A is illustrated and will be discussed in reference to FIG. 14.

Figure 3:
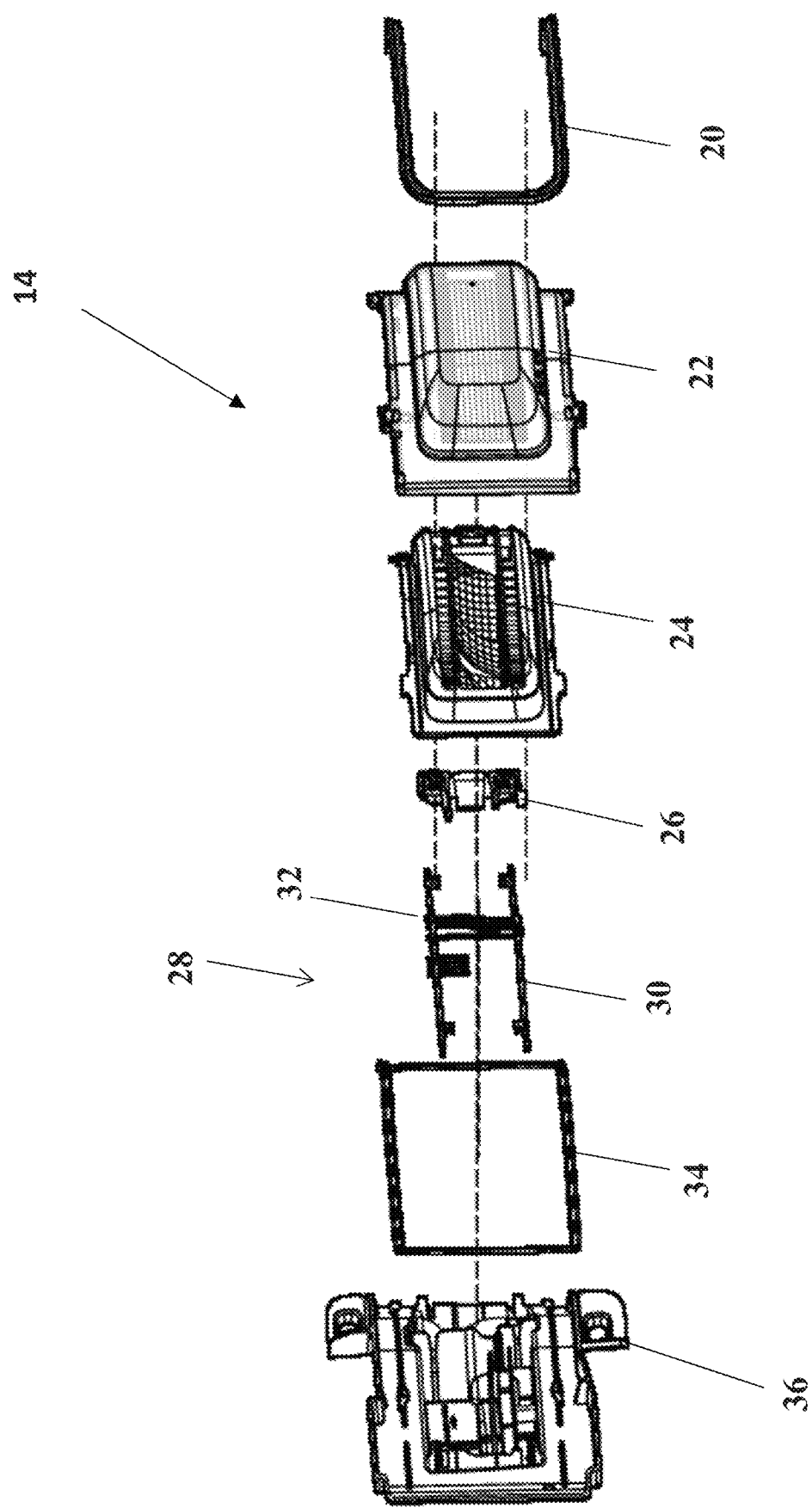
FIG. 3 illustrates a right perspective exploded view of the light assembly according to the present disclosure.
Figure 4:
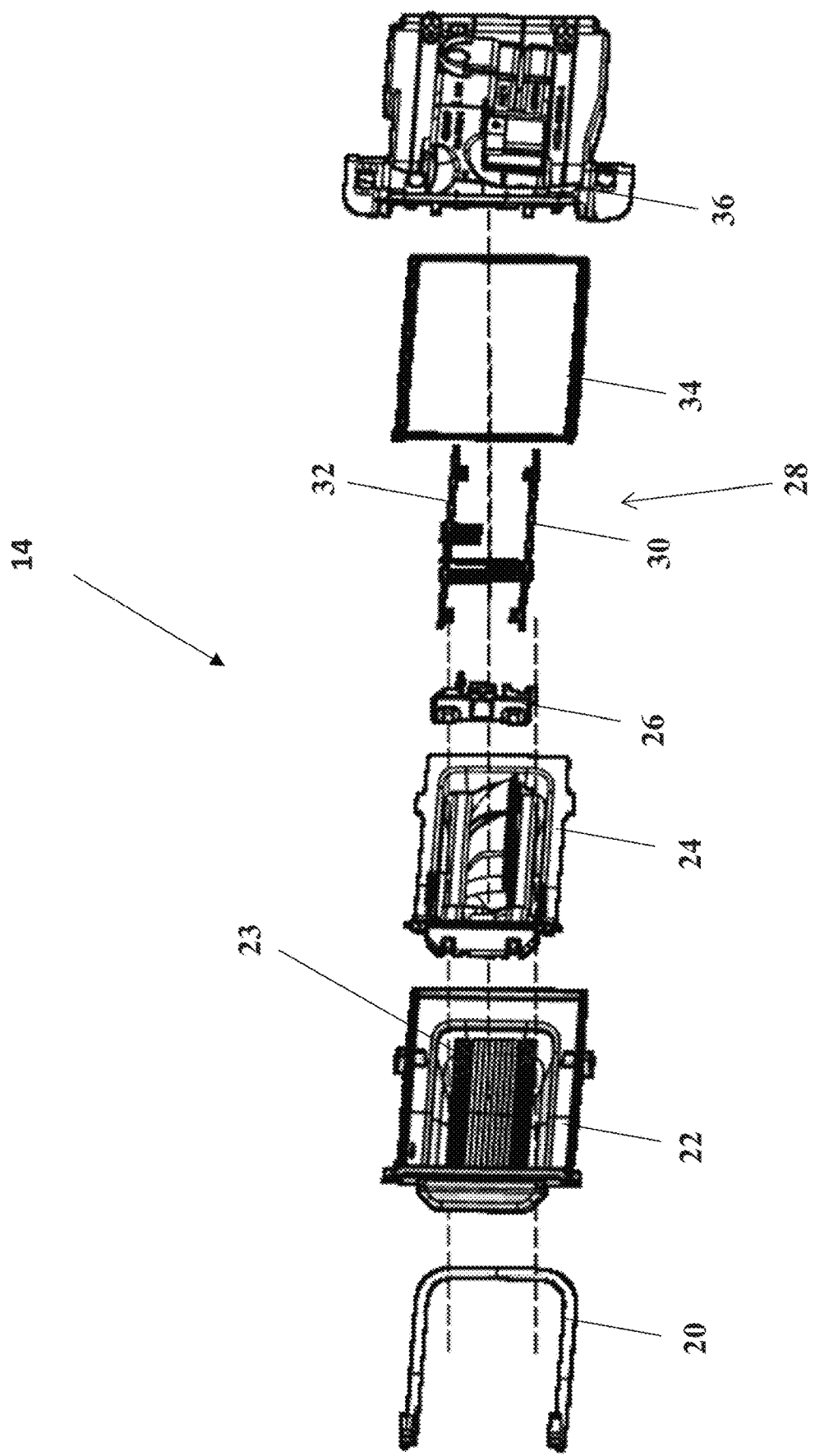
FIG. 4 illustrates a left perspective exploded view of the light assembly according to the present disclosure.

FIG. 3 is a right perspective exploded view of the light assembly 14. FIG. 4 is a left perspective exploded view of the light assembly 14. In FIGS. 3 and 4, the components of the light assembly 14 include a first gasket 20, the lens 22, a reflector body 24, a light collector 26, a printed circuit board (PCB) assembly 28, a second gasket 34, and the housing 36. The PCB assembly 28 has a lower PCB 30 and an upper PCB 32. The first and second gasket 20, 34 may provide sealing against water ingress and containments for the light assembly 14. The lens 22 has a cavity 23 in which the reflector body 24 is at least partially inserted when assembled.

Figure 5:
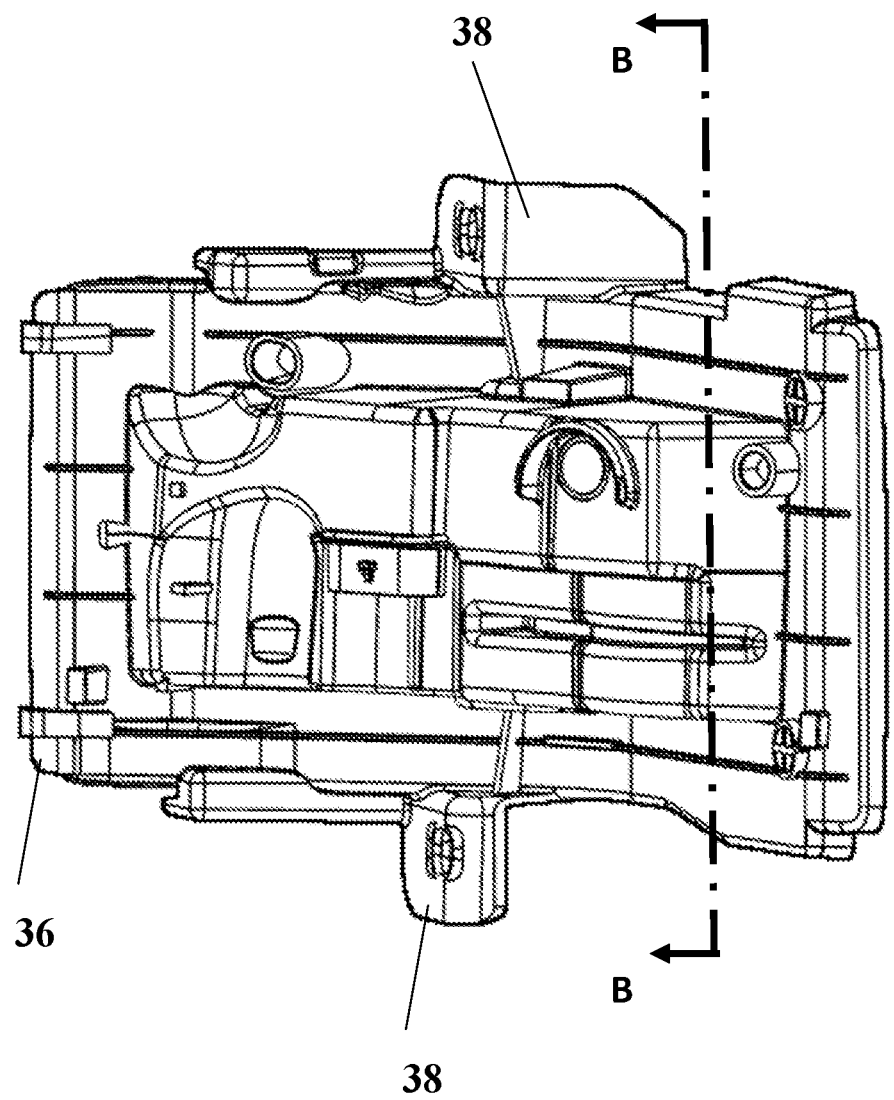
FIG. 5 illustrates a rear perspective view of the housing of the light assembly according to the present disclosure.
Figure 6:
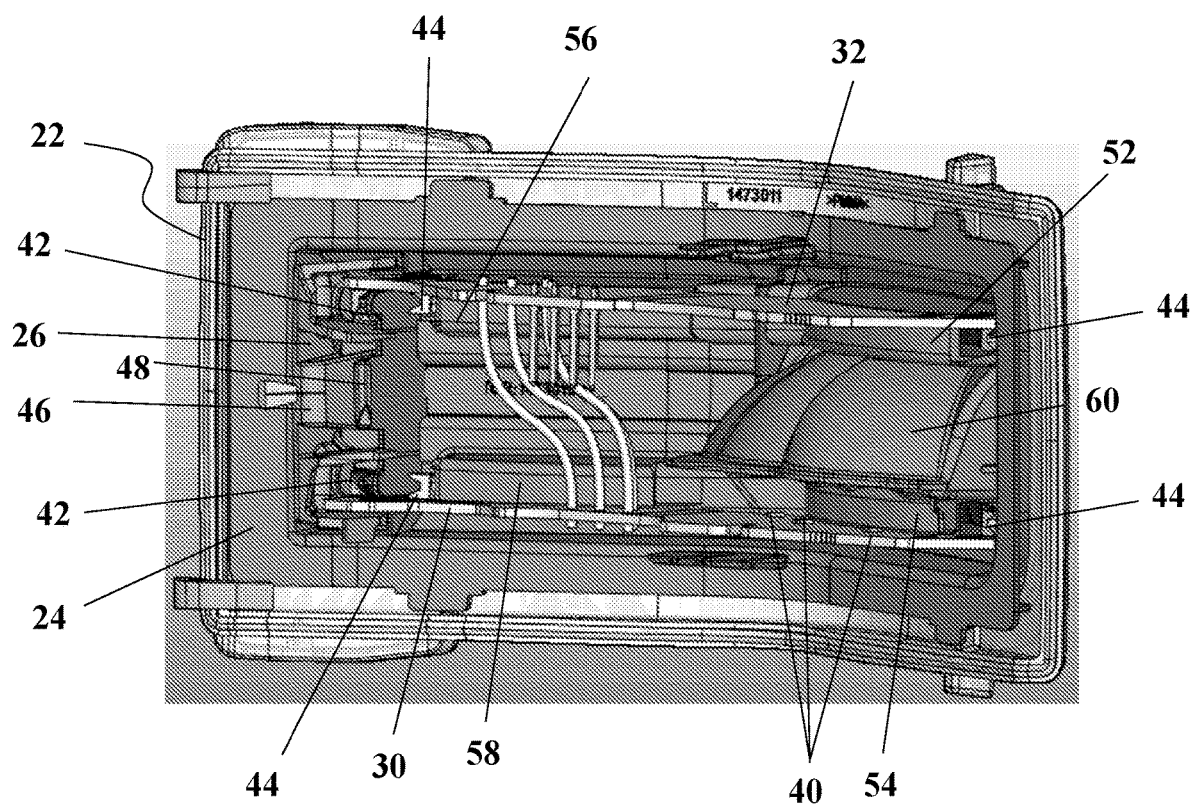
FIG. 6 illustrates a rear perspective view of the light assembly without the housing according to the present disclosure.
Figure 7:
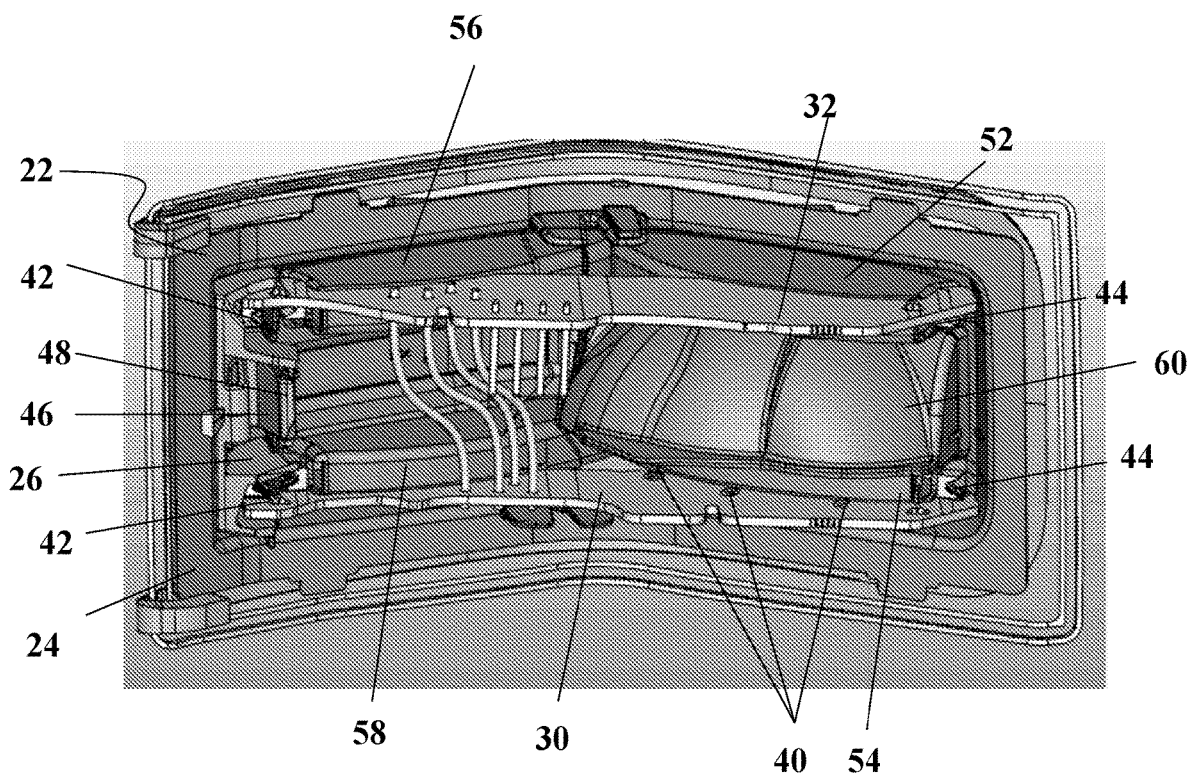
FIG. 7 illustrates a rear perspective view of the light assembly without the housing according to the present disclosure.
Figure 8:
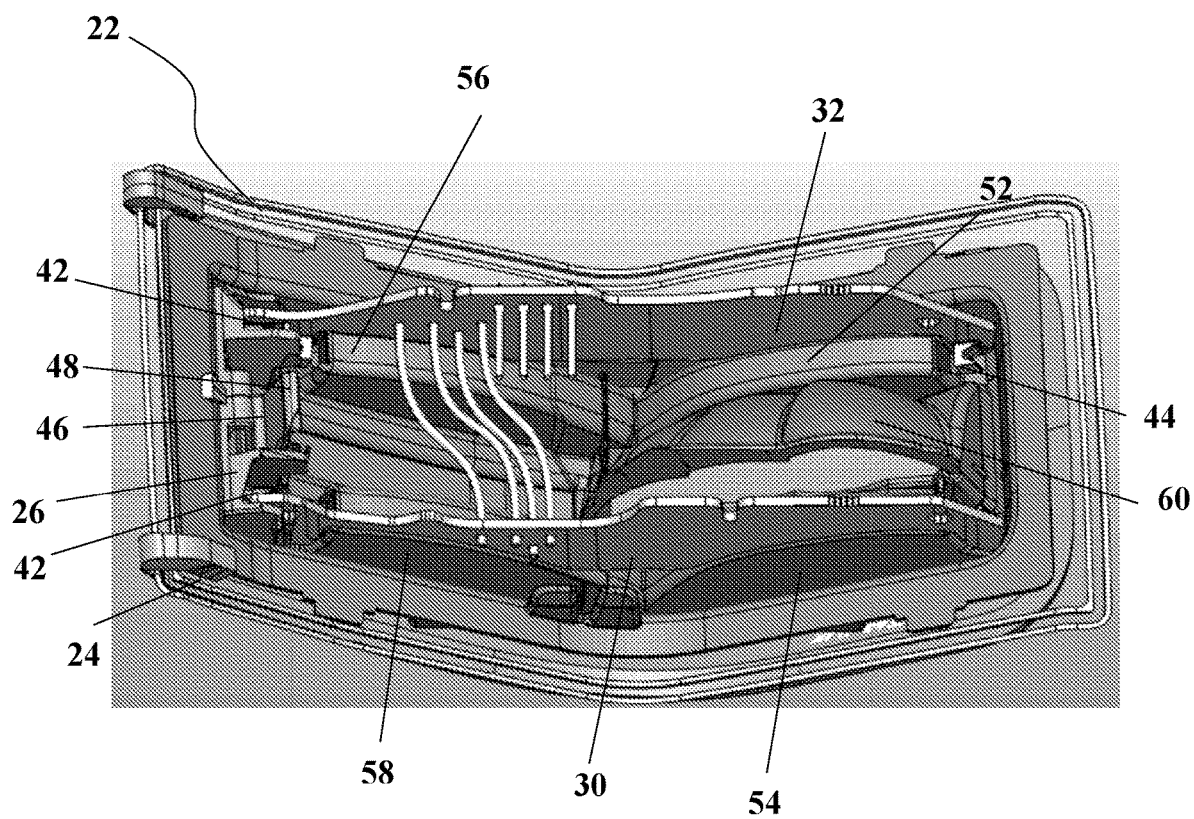
FIG. 8 illustrates a rear isometric view of the light assembly without the housing according to the present disclosure.
Figure 9:
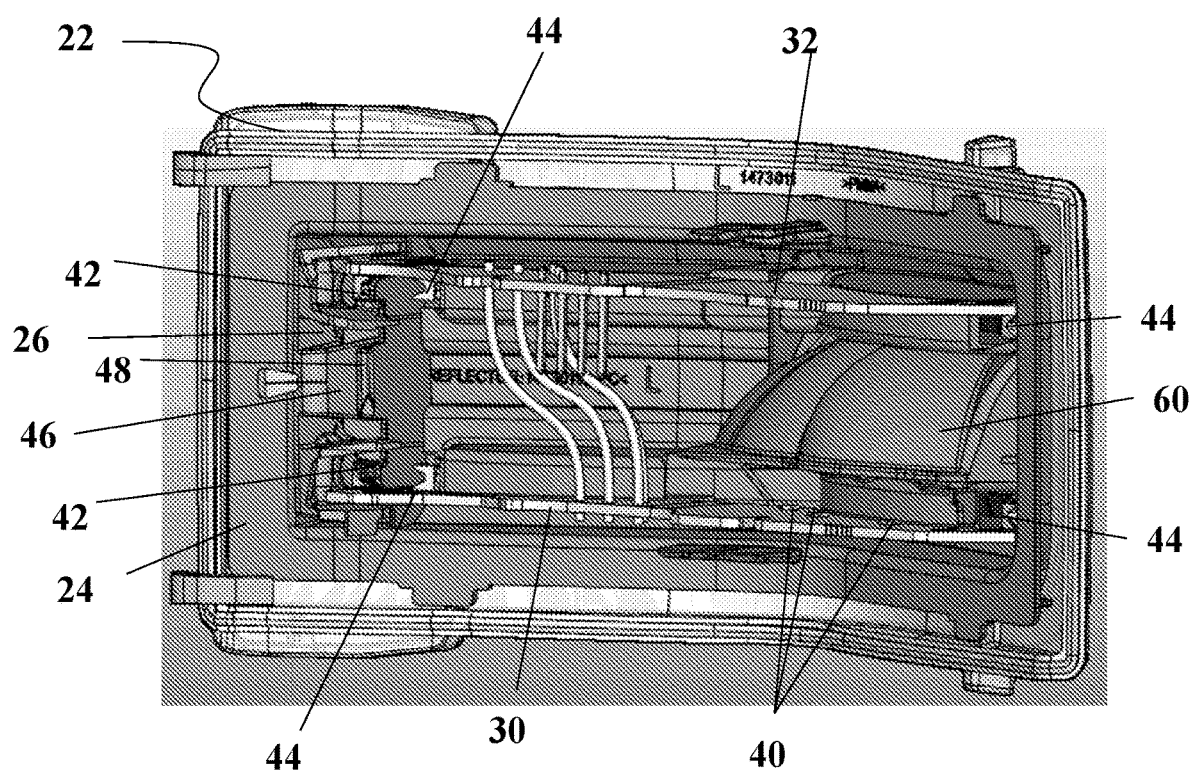
FIG. 9 illustrates a rear perspective view of the light assembly without the housing according to the present disclosure.

FIG. 5 illustrates a perspective view of the housing 36. The housing 36 provides mounting of the light assembly 14 to the mirror head 16 via two tabs 38. A fastener (not shown) may be used to secure the light assembly 14 to the mirror head 16. Other fastening methods may be used to mount the housing 36 to the mirror head 16.

FIG. 6-9 illustrate a rear perspective view of the light assembly 14 without the housing 36 and the second gasket 34. The reflector body 24 is shown assembled in the cavity 23 (FIG. 4) of the lens 22. In this form, the PCB assembly 28 (FIG. 3) contains the upper PCB 32, the lower PCB 30, at least one first light source 40 (light emitting diode), at least one second light source 42, and at least one third light source 44 shown in FIG. 6. The PCB assembly 28 cooperates with the reflector body 24 to retain the PCB assembly 28. In this form, the first light source 40, the second light source 42, and the third light source 44 provide different light functions and may be activated by the vehicle operator or passenger from the vehicle interior, for example via a switch or HMI input. In other forms, the light source light functions for the light assembly 14 may also be activated from the vehicle exterior such as by a switch located on the mirror assembly 10 (mirror head 16 or mirror base 18) or other area or remotely via a key fob or mobile device. In this form, the at least one first light source 40 comprises three light sources attached to the lower PCB 30, the at least one second light source 42 comprises four light sources with two mounted to the upper PCB 32 and two mounted to the lower PCB 30, and the at least one third light source 44 comprises two light sources with one mounted to the upper PCB 32 and one mounted to the lower PCB 30; but other arrangement may be used within the scope of this disclosure. Preferably, the first, second and third light sources 40, 42, 44 are point light sources such as light emitting diodes (LEDs). In one form, the at least one first light source 40 is a high powered (1 W) LED. In this form, the reflector body includes slots for placement of the PCB assembly 28 and a reflector element 60 for the first light source 40. The reflector body has an integrated first and second upper channel 52, 56 and a first and second lower channel 54, 58 associated with the at least one third light source 44.

Prominent examples for functions of the first, second, and third light sources incorporated into rearview devices comprise illumination devices, for example any kind of light module like an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof. In other forms, there may be more or less light source groups and locations on the PCB assembly 28.

The light collector 26 is positioned over the at least one second light source 42. In this form, there are two second light sources 42 directed to the side of the mirror head 16 which the light collector 26 is configured to cover and collect light emitted from the second light sources 42. The geometry of the light collector 26 is defined by the PCB assembly 28, the reflector body 24, the housing 36 (FIG. 3) and the light sources 42 to be covered. In this form, the light collector 26 is retained in a space defined by the PCB assembly 28, the reflector body 24, and the housing 36 and the geometry of the light collector 26. The light collector 26 is not attached by any fastening means to the space defining components. The light collector 26 in this form contains a biasing element 46 which mitigates potential vibrational issues which may arise from the light collector 26 placement. In this form, the biasing element 46 is an integral part of the light collector 26 but may be any known biasing element 46 to provide a bias force on the light collector 26. As shown in FIGS. 6-9, the biasing element 46 has a first end 48. When the housing 36 (FIG. 3) is placed over the assembly shown in FIG. 6-9, the first end 48 makes contact with the housing 36, compressing the first end 48 of the biasing element 46. Internal structures such as ribbing or other elements may be utilized in the housing 36 to provide contact with the first end 48 of the light collector 26. The contact creates a bias force securing the light collector 26 in position reducing potential vibration. Other non-limiting examples of assembly of the light collector 26 may be to fasten the light collector 26 with a fastener such as a screw or an adhesive to another part in the light assembly 14.

Figure 10:
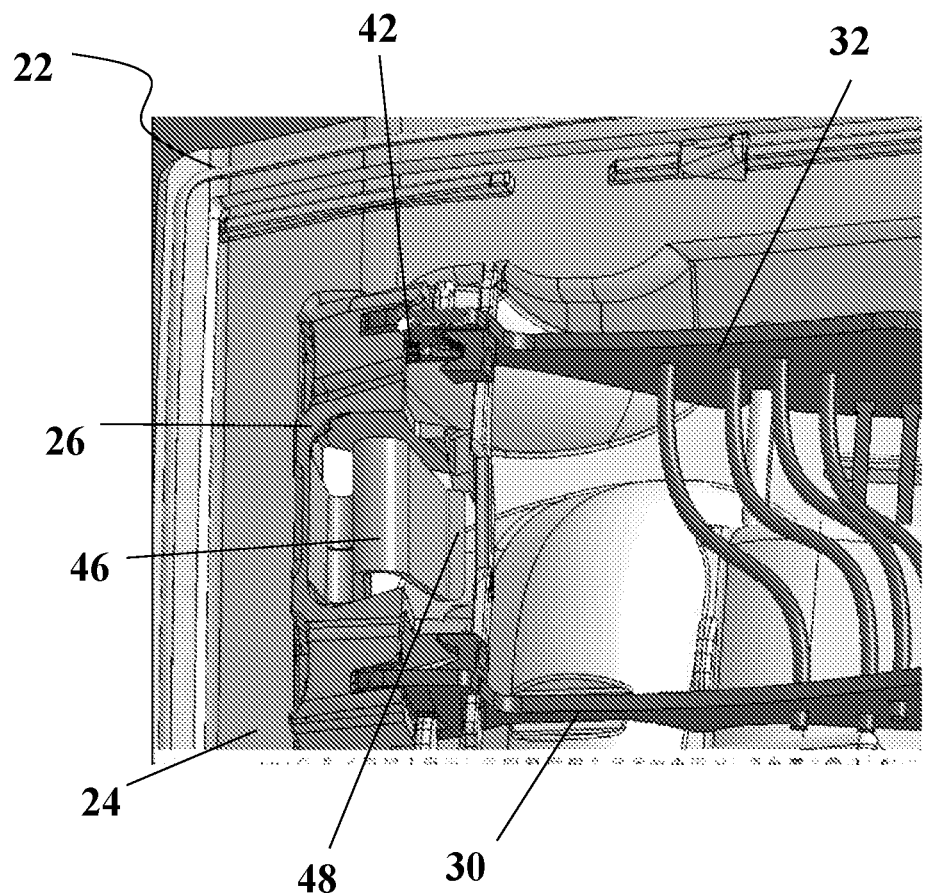
FIG. 10 illustrates a rear perspective view of a light collector according to the present disclosure.
Figure 11:
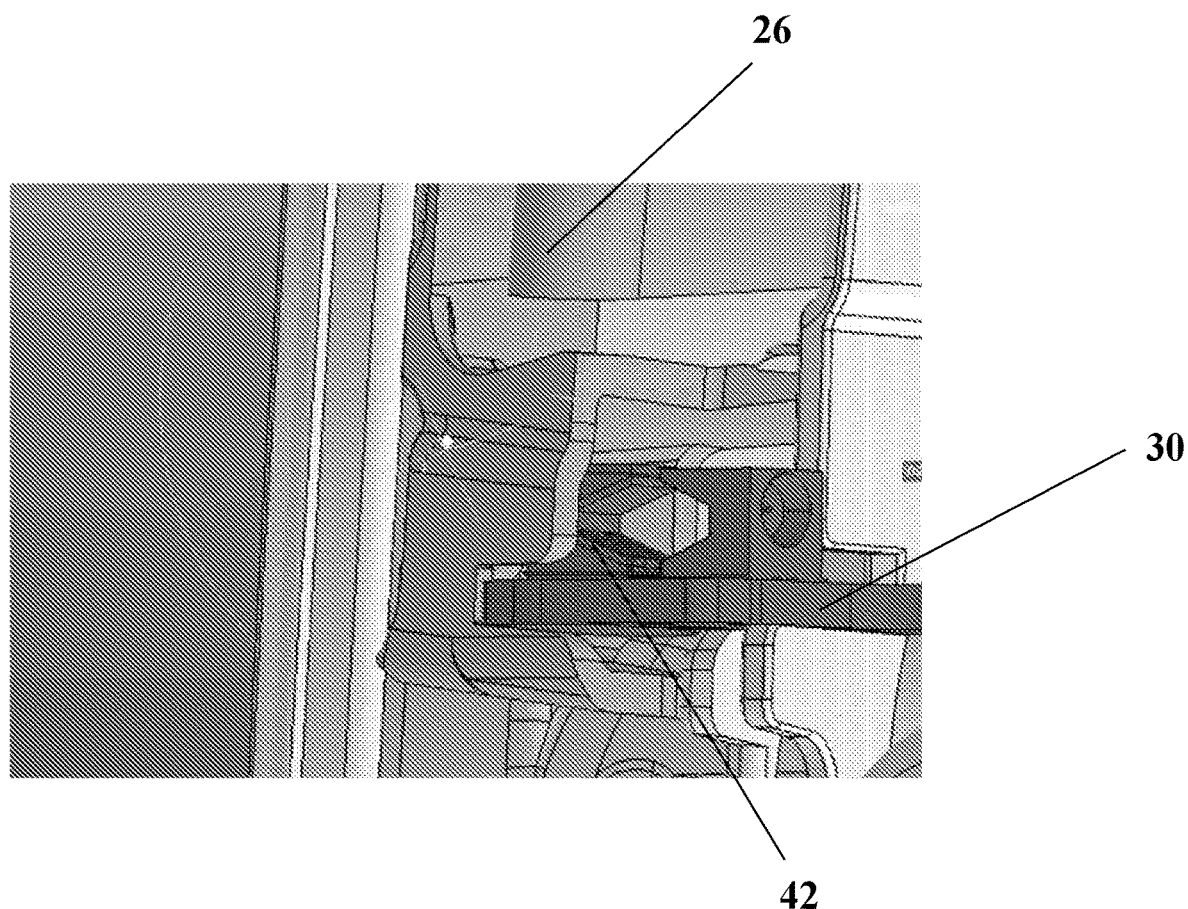
FIG. 11 illustrates a rear perspective view of the light collector according to the present disclosure.

FIGS. 10-11 illustrate enlarged perspective views of a light collector 26. The light collector 26 geometry is selected to cooperate with the upper PCB 32, the lower PCB 30 and the at least one second light source 42 to collect the output light from the at least one light source 42. In this form, the light collector 26 collects and provides light manipulation for all light output from the at least one light source 42 which becomes visible through the lens 22 of the light assembly 14 (FIG. 2). The geometry of the light collector 26 may be adjusted to collect the light from different light source angles and mounting configurations but collects all light that will be visible from the lens 22. Once the light from the at least one second light source 42 is captured, the light collector 26 can manipulate the light and transform the light by wavelength or light direction. In this form, the at least one second light source 42 provides a turn light signal having a non-amber color. A selected second light source 42 has a specific wavelength for the light outputted associated with the particular brand or model of light source. A pigment is added to a clear acrylic base material to provide modification of the light through the light collector 26 to meet the regulation hue for a turn light signal. In an exemplary form, the light collector 26 is tinted to a specifically formulated hue to provide an amber output color for light leaving the light collector 26. The formulated tinted acrylic is able to be tuned to match a specific inputted light source light color of the second light source 42 to the light collector 26 achieving a specific amber output light color by varying the thickness of the light collector 26. Specifically, a thicker cross section for the light collector 26 coverts a bluer tone light source output to the required amber color and a thinner cross section can covert a yellower toned light source output to the desired amber hue. This allows for flexibility of light source selection without needing different tinting formulas for the light collector 26. This flexibility in thickness manipulation would also be available for colors other than amber for a light collector 26. In another form, the second light source 42 may have a dual use to provide for a turn light signal and a hazard light signal.

In this form, the light collector 26 is a single tinted color but it may be designed to have different zones each with a different tinting hue. A multi-zoned light collector 26 may be manufactured with a two shot or overshot process. This would allow for use of a single part for multiple hues in a light assembly 14 from different light sources. Other light manipulations may also be included in the light collector 26 such as an integral light pipe or optics to direct the light received from any light sources associated with the light collector 26. More than one light collector 26 may also be used for different light source groups within the light assembly 14. The light collector 26 may also be used to create a uniform appearance for light seen from the outside after passing through the light collector 26 from the at least one second light source 42. In this form, the light collector 26 prevents viewing of the at least one second light source 42 and the PCB assembly 28 from the outside of the light assembly which may be undesirable for a certain use cases. In this form the light collector 26 is used for direct illumination from the at least one second light source 42 through the lens 22. In another form the light collector 26 may be used to provide indirect or light pipe light. The modified light exiting the light collector 26 may be reflected by a reflector or directed though a light pipe after leaving the light collector 26. The light collector 26 may be used with any of the example light functions illustrated above.

Figure 12:
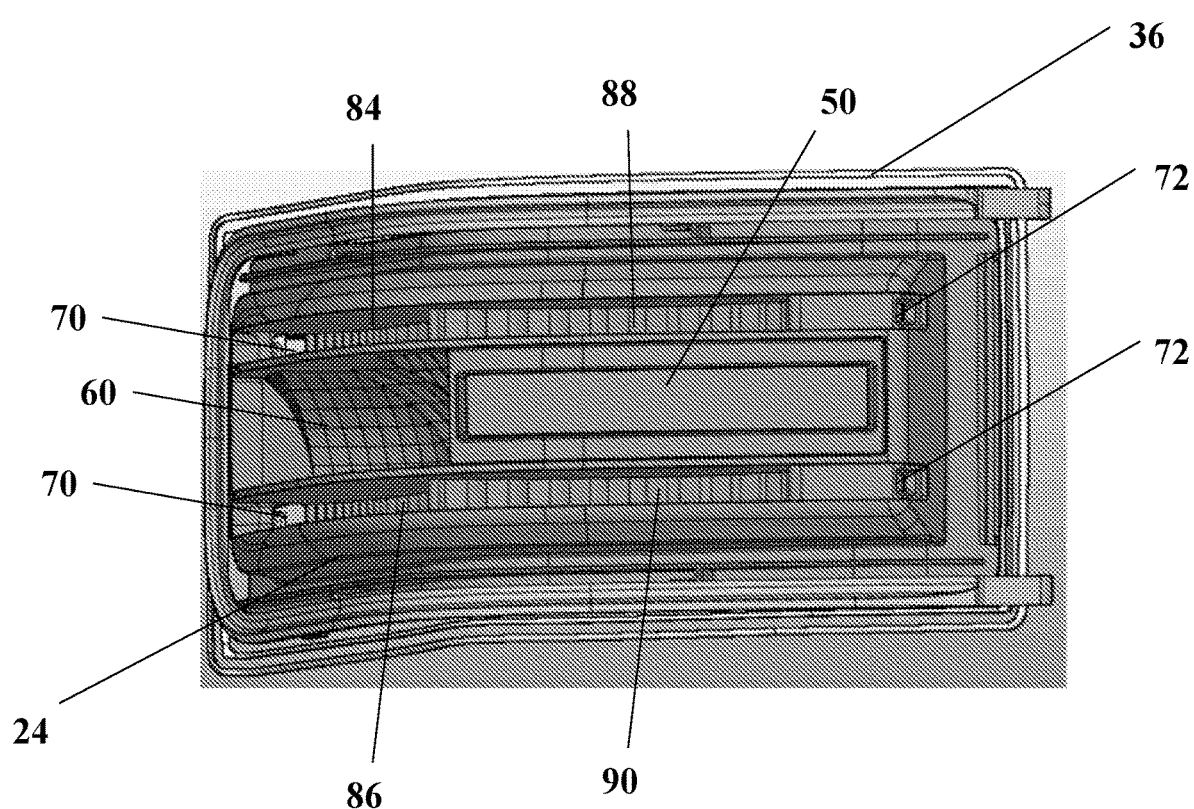
FIG. 12 illustrates a front perspective view of the reflector body according to the present disclosure.
Figure 13:
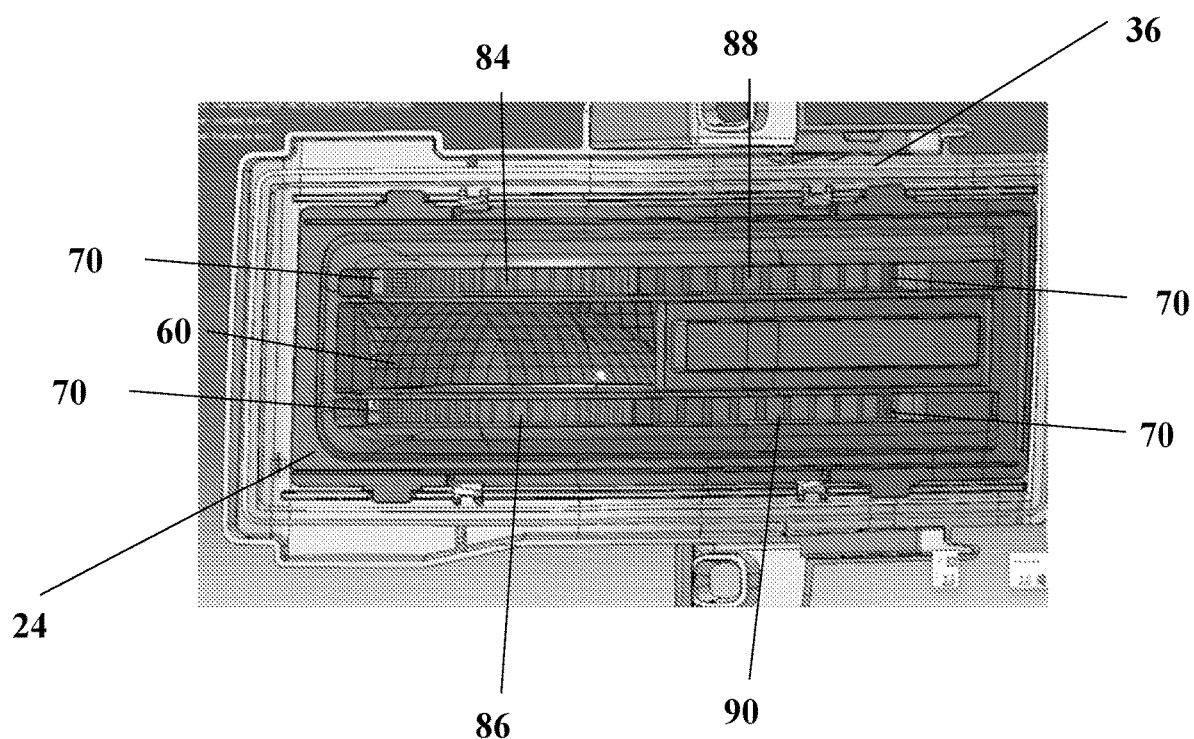
FIG. 13 illustrates a front perspective view of the reflector body according to the present disclosure.

FIGS. 12-13 illustrates a front perspective view of the reflector body 24 shown assembled in the housing 36. The PCB assembly 28 with the at least one first light source 40, the at least one second light source 42 and the at least one third light source 44 is mounted between the housing 36 and the reflector body 24 as illustrated in FIG. 2. The reflector body 24 has a first upper optic 84 which is integral in the first upper channel 52, a first lower optic 86 integral in the first lower channel 54, a second upper optic 88 integral in the second upper channel 56, and a second lower optic 90 integral in the second lower channel 58. An aperture 70 is located at the outboard end of each of the channels 52, 54, 56, 58 to allow the at least one third light sources 44 to enter the optics areas of the optics 84, 86, 88, 90. The reflector body 24 has an aperture 72 per the second light sources 42 which allow the light transmitted from the second light sources 42 through the light collector 26 to be visible.

An indicia area 50 may provide a location for a printed, integral or embossed logo or symbols on the reflector body 24. For example, a manufacture name may be embossed in this location to provide brand recognition. The reflector element 60 has a curve to reflect the light received from the at least one first light source 40. In this form, there are three first light sources 40 arranged in a horizontal arc arrangement on the lower PCB 30. These first light sources 40 produce light which reflects off the reflector element 60 in the direction of the vehicle travel for use as a spotlight or security light. It is known to provide illumination or light sources at the side of the vehicle, such as to provide security lighting or convenience lighting at the side of the vehicle. For example, such a lighting device is described in U.S. Pat. No. 10,232,765 which is hereby incorporated herein by reference in its entirety.

Figure 14:
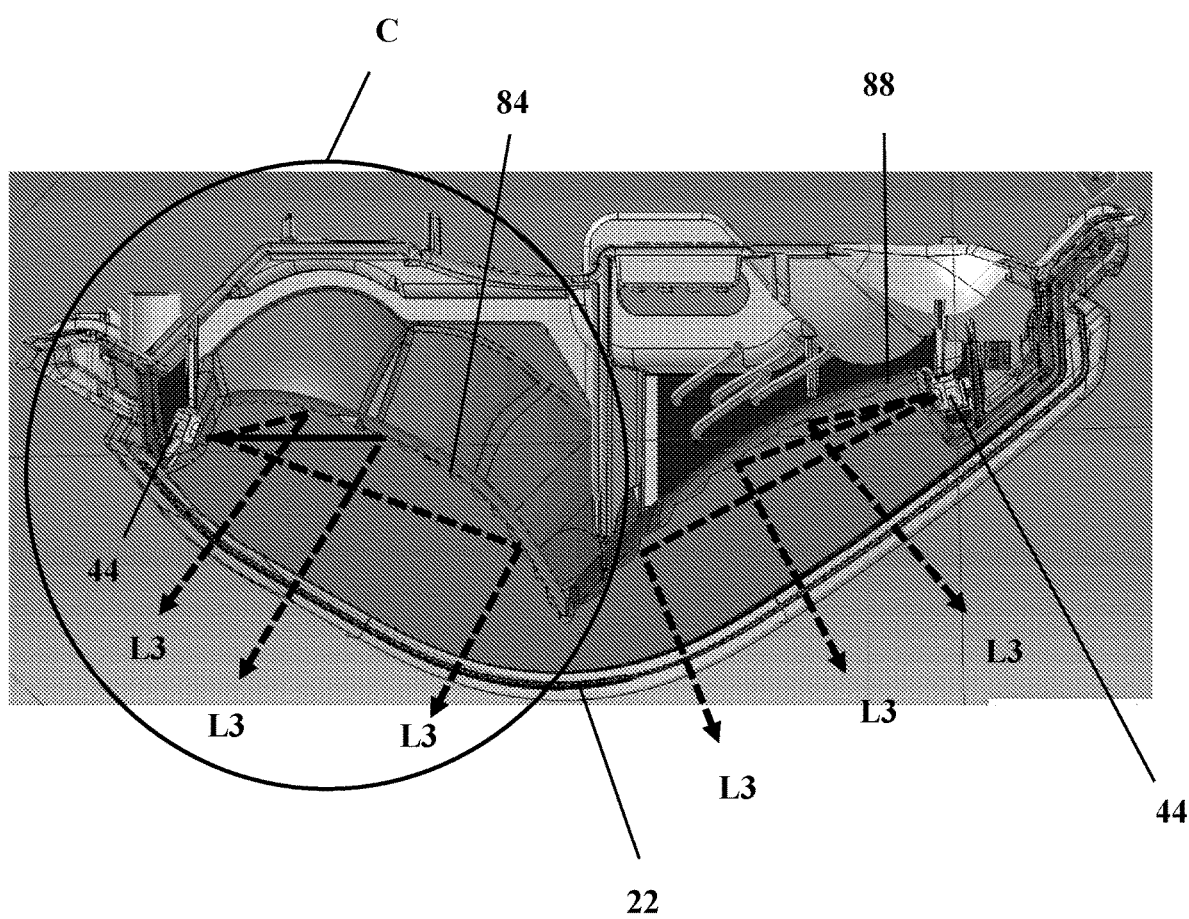
FIG. 14 illustrates a top sectional view of the light assembly according to the present disclosure.

FIG. 14 illustrates a top sectional view of the light assembly 14 utilizing the section A-A illustrated in FIG. 2. Light L3 emitted from each third light source 44 is directed to the first and second upper optics 84, 88. The light L3 is redirected by the associated pitch optics for each third light source 44 along the surface of the first and second upper optics 84, 88 to exit through the lens 22. The first and second lower optics 86, 90 have an associated pitch optics as described for the first and second upper optics 84, 88 and direct light from the third light sources 44 based on those pitch optics. The pitch optics for the first upper optic 84, the second upper optic 88, the first lower optic 86, and the second lower optic 90 may be the same or the pitch optics may be selected to achieve a different light output for each area.

Figure 15:
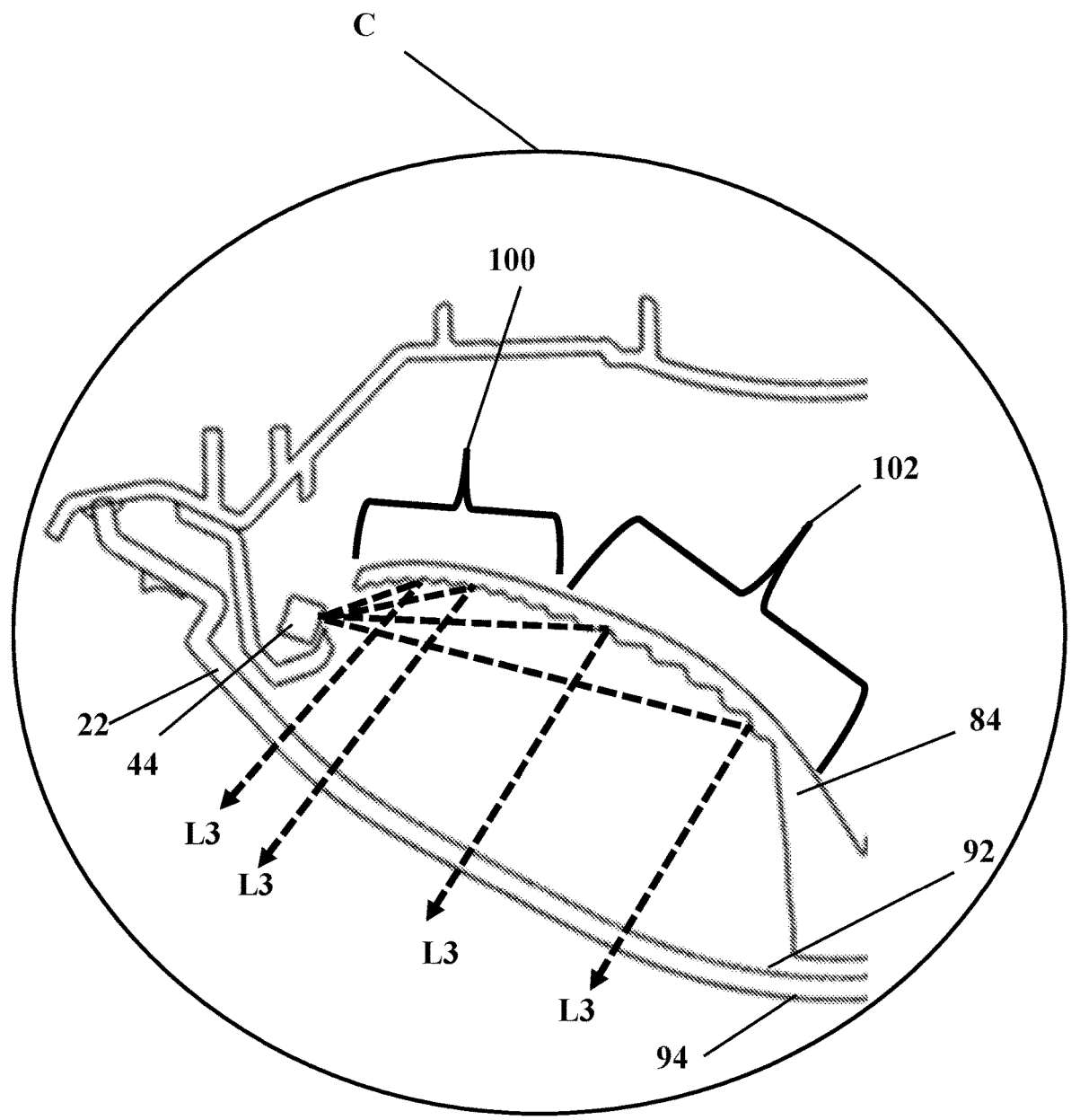
FIG. 15 illustrates an enlarged view of the first upper optic section element of the reflector body according to the present disclosure.

An area C is defined in FIG. 14 for use in FIG. 15. FIG. 15, thus, illustrates an enlarged view of the first upper optic 84 of the reflector body 24 from Area C defined in FIG. 14. This figure illustrates the details of the optics associated with the first upper optic 84. The first upper optic 84 has at least two distinct pitch optics in a first pitch optic section 100 and a second pitch optic section 102. The first upper optic 84 receives light L3 emitted from one third light source 44 when the respective light source is energized. The light L3 emitted is directed to the first and second pitch optic sections 100 and 102. The first pitch optic section 100 contains a fine pitch optic to reflect the lower power light L3 emitted from the third light source 44. The second pitch optic section 102 contains a coarse pitch to spread the higher power light L3 from the third light source 44 over a larger area.

Figure 16:
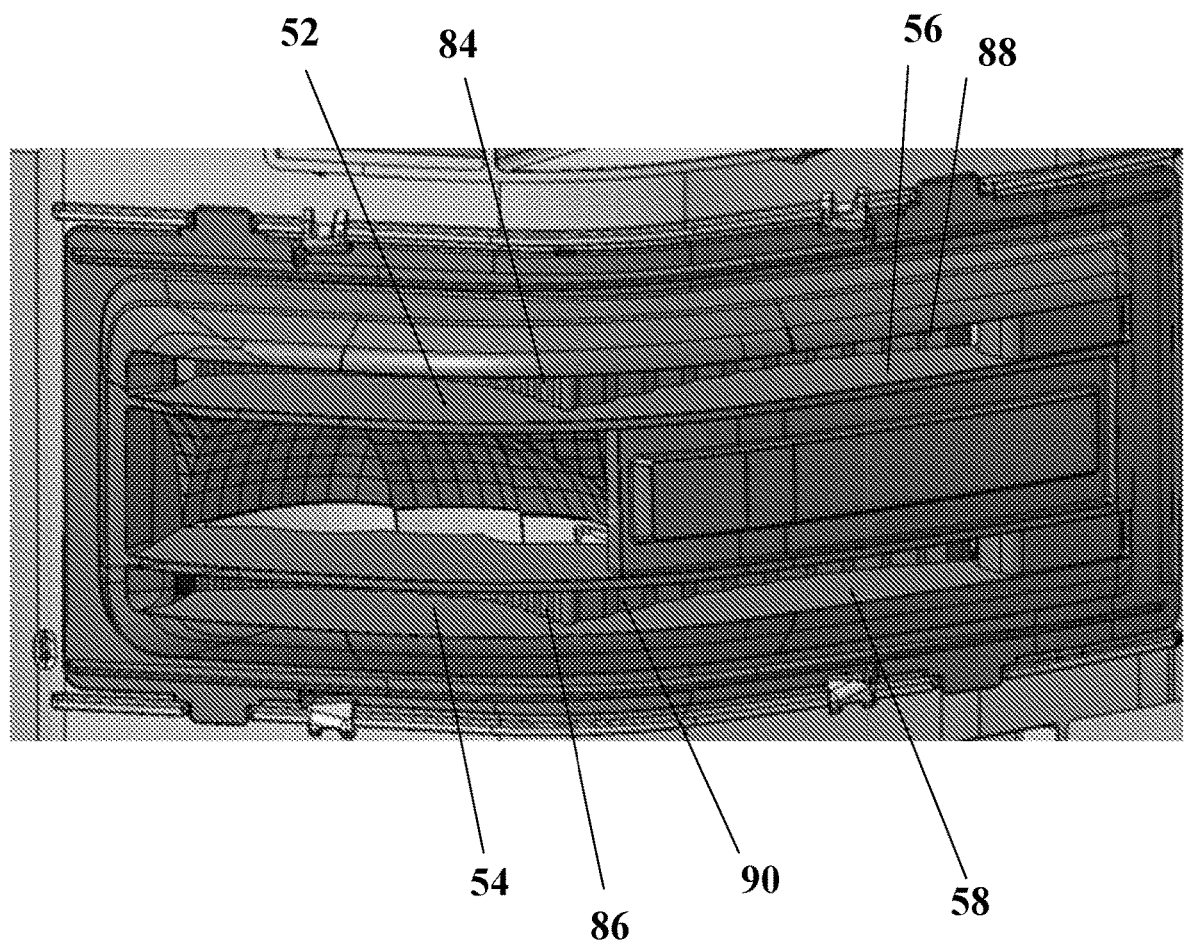
FIG. 16 illustrates a front perspective view of the reflector body according to the present disclosure.

FIG. 16 illustrates a front perspective view of the reflector body 24. This view illustrates the front view specifically of the first upper channel 52, the second upper channel 56, the first lower channel 54, and the second lower channel 58. The first upper optic 84, the second upper optic 88, the first lower optic 86, and the second lower optic 90 are recessed in the respective channels. This arrangement of recessing the optics into the channels 52, 54, 56 and 58 restricts the emitted light from spreading past the area defined by the channels.

Figure 17:
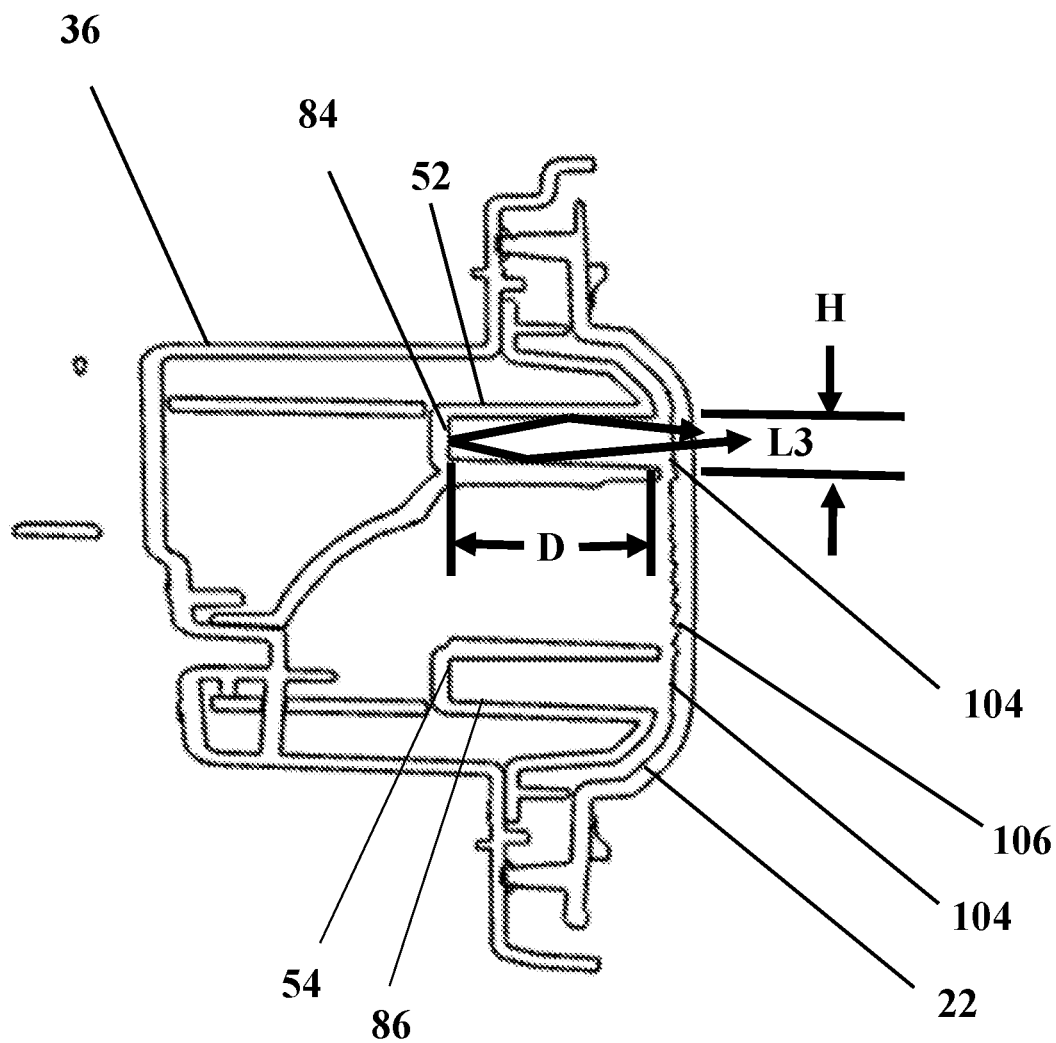
FIG. 17 illustrates a section view from the section line B-B shown in FIG. 5 according to the present disclosure.

FIG. 17 illustrates a section view from the section line B-B shown in FIG. 5. In this section the depth D and height H of the first upper channel 52 is illustrated. The first upper channel 52 is extended a depth D to restrict the light L3 from spreading upward and downward. This creates a light effect defined by the height H visible through the lens 22. In this form, the first lower channel 54, the second upper channel 56, and the second lower channel 58 are designed with the same height H, and the light assembly 14 is placed in mirror assembly to give a horizontal appearance to the light emitted from the third light source 44. This configuration creates a uniform light effect which mimics a light pipe through the lens 22 without the use of a light pipe structure. In other forms, the height H may be different between the different channels to create different optical effects. The second upper channel 56 and the second lower channel 58 in this form function as described for the first upper and lower channel 52, 54. In other forms, the channels may be designed to have different parameters.

The lens 22 may have at least one first lens optic 104 and at least one second lens optic 106. In this form, the lens 22 has two first lens optics 104, illustrated as an upper and lower optic section, which correspond to the height H and location of the upper and lower channels 52, 54. The first optic sections extends along the lens 22 to correspond to the second upper and second lower channels 56, 58. The first lens optic 104 is designed in this form to have a fine pitch optics and texture on the inner surface of the lens 22. This will homogenize the light outputted from the channel 52, 54, 56, and 58 through the lens 22 and provide an improved light appearance.

Figure 18:
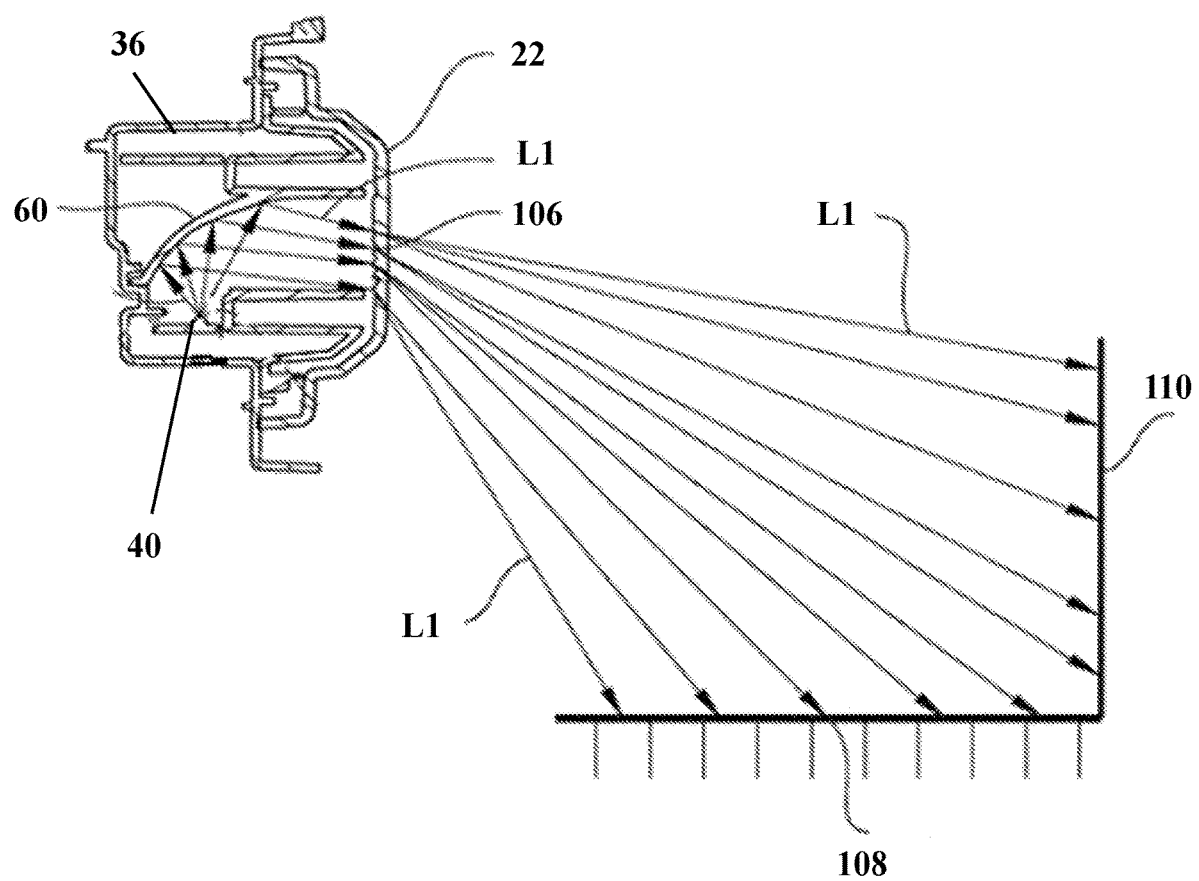
FIG. 18 illustrates a section view from the section line B-B shown in FIG. 5 according to the present disclosure.

FIG. 18 illustrates a section view from the section line B-B shown in FIG. 5. In this figure, the second lens optic 106 will be described. An example of the light path of light L1 emitted by one first light source 40 is shown. The reflector element 60 is located above the first light source 40 such that the light L1 emitted from the first light source 40 is emitted upward and spread into the reflector element 60. The reflector element 60 reflects the light generally downward toward the second lens optic 106. The surface optics of the second lens optic 106 are designed to direct the light L1 through the lens 22 toward a ground area adjacent to the vehicle. A ground plane target 108 and a vertical plane target 110 define the area outside the lens which is to be illuminated by the light.

Figure 19:
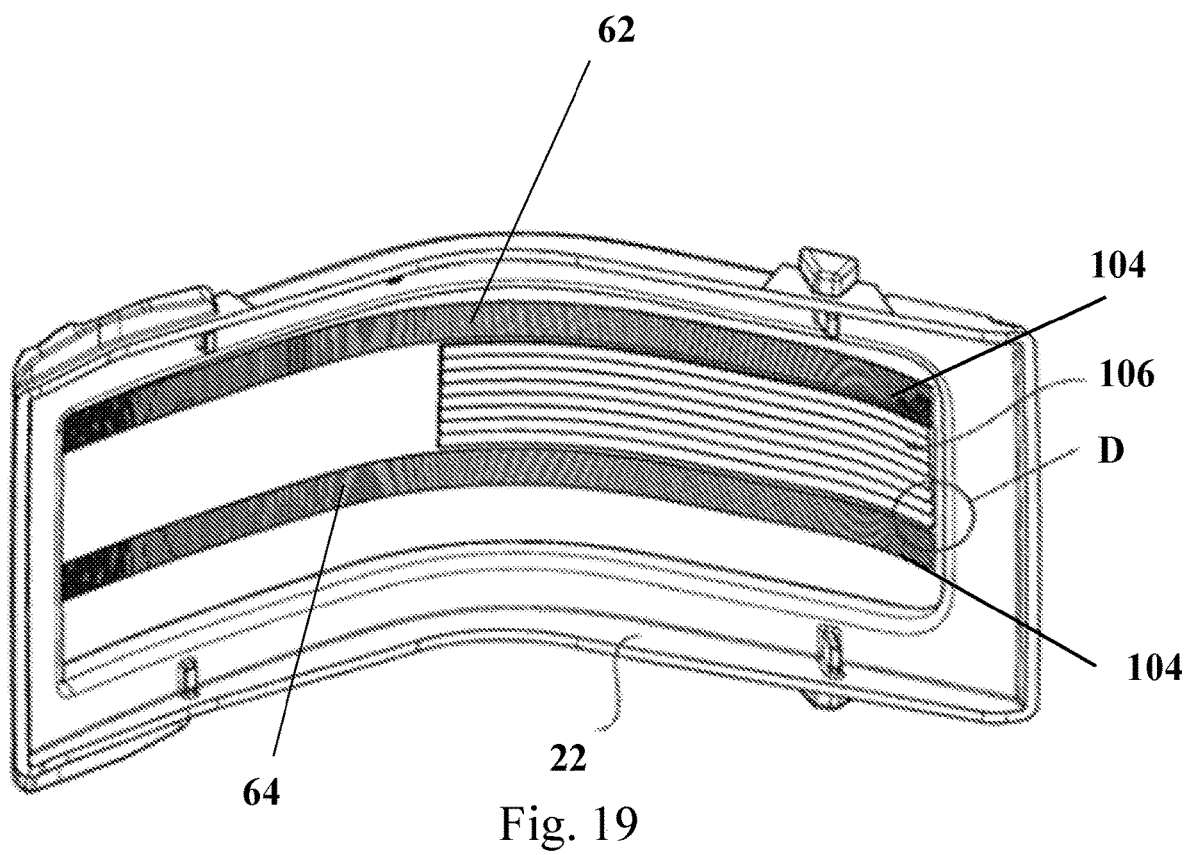
FIG. 19 illustrates a rear perspective view of a lens according to the present disclosure.

FIG. 19 illustrates a rear perspective view of the lens 22. In this form, the two first lens optics 104 are visible along the length of the lens 22. The combining of the channels 52, 54, 56, 58 with the optic sections creates an upper light output area 62 and a lower light output area 64 generated from the third light sources 44.

Figure 20:
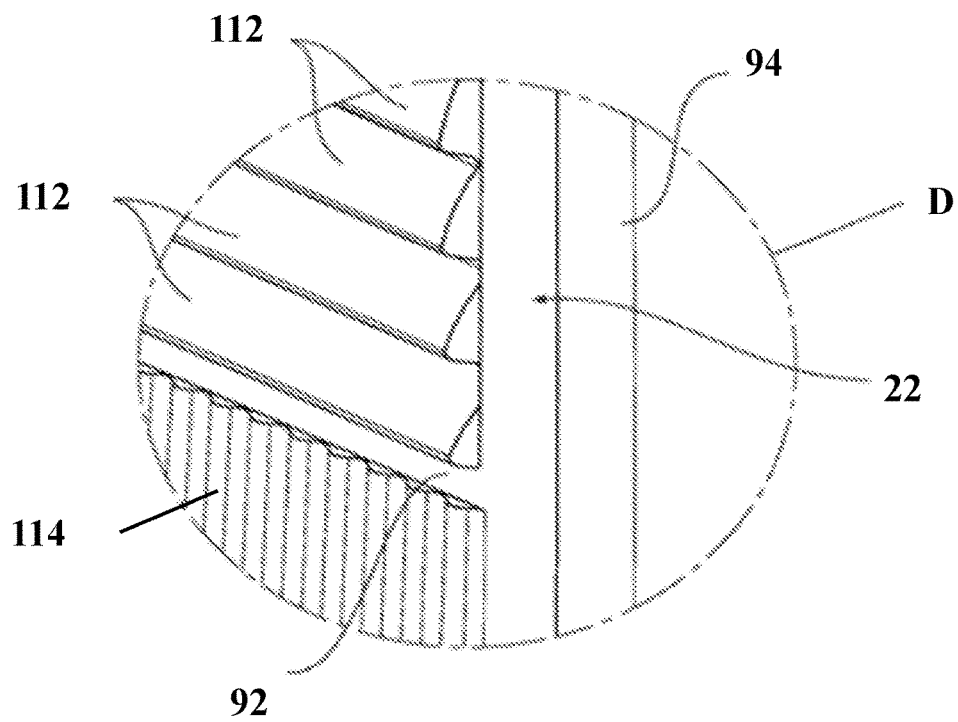
FIG. 20 illustrates an enlarged section D of the inner surface of the lens according to the present disclosure.

A circle D in FIG. 19 defines an area enlarged to show the inner surface of the lens 22 in FIG. 20. FIG. 20 shows further details of the first lens optic 104 and the second lens optic 106. In the enlarged area D from FIG. 19 FIG. 20 shows an enlarged view of the surface geometry from the first lens optic 104 and the second lens optic 106. The first lens optic 104 has a homogenizing surface 114 on the inner side 92 of the lens 22. The homogenizing surface 114 is designed to refract the light L3. This creates a more uniform light appearance in the first lens optic 104. The second lens optic 106 has a sloped surface 112 which function to refract the light rays L1 from reflection element 60 toward the ground.

Figure 21:
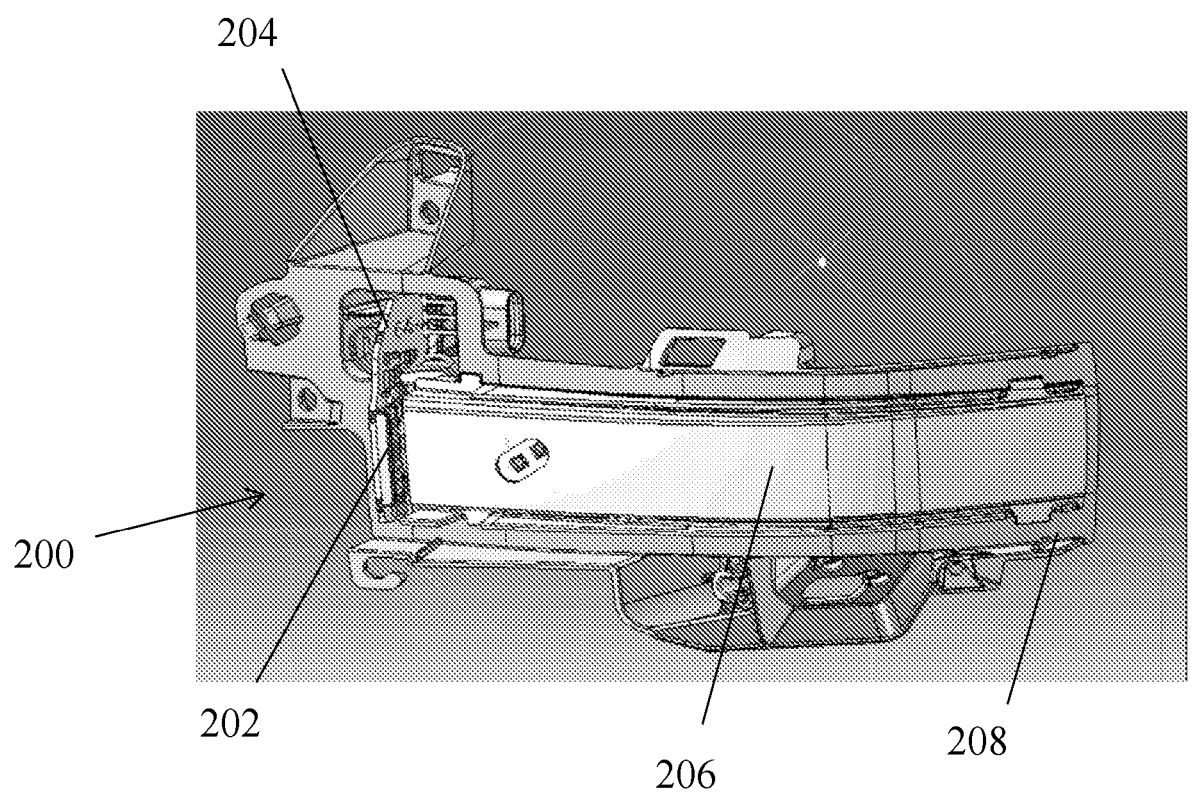
FIG. 21 illustrates a front perspective view of an alternate light module without a lens according to the present disclosure.
Figure 22:
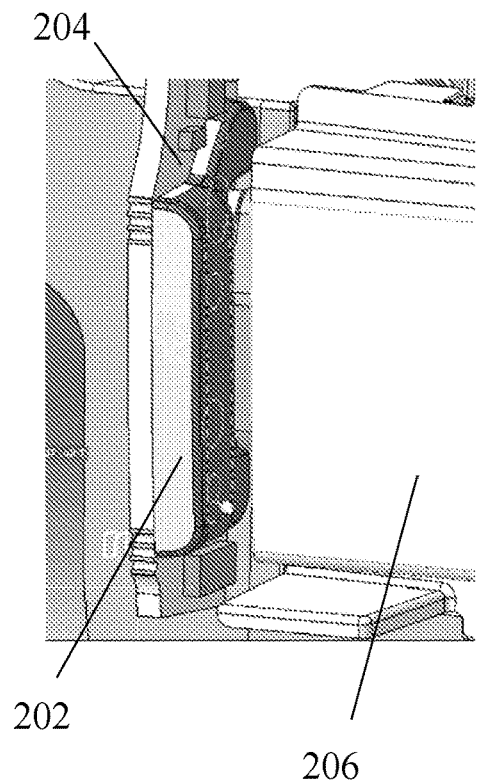
FIG. 22 illustrates an enlarged front perspective view area of the alternate light module of FIG. 21 according to the present disclosure.
Figure 23:
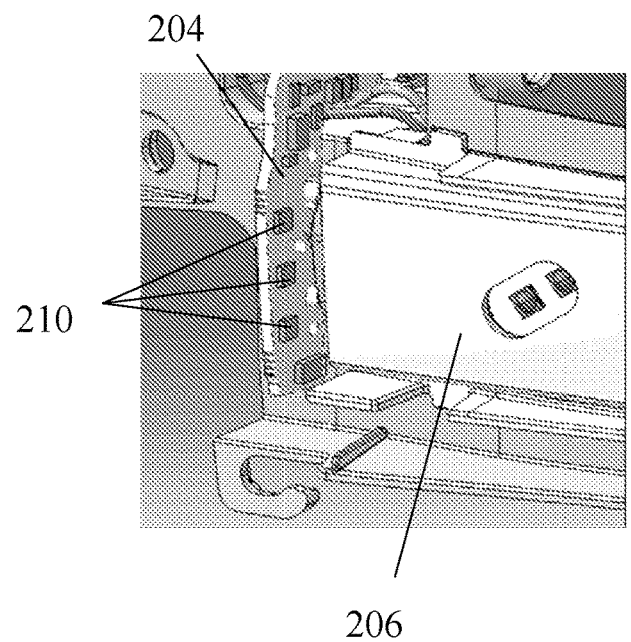
FIG. 23 illustrates an enlarged front perspective view area of the alternate light module of FIG. 21 without the light collector.

FIG. 21-23 illustrate an alternative variation for use of a light collector 202 in a light module 200. In this variation, FIG. 21 illustrates a light module 200, a light collector 202, a PCB 204, a screen 206, and a housing 208. The light collector 202 is designed to cover three light sources 210 mounted on the PCB 204. The light collector 202 is designed to fit around the light sources 210 and cooperates with the PCB 204 to capture light emitted from the light sources 210. The light emitted through the light collector 202 is then directed along the light pipe (not shown). This variation attaches the light collector 202 via a fastener to the PCB 204 (FIG. 21). The light collector 202 is a formulated tinted acrylic as described for light collector 26.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

REFERENCE SIGN LIST

- 10—Mirror Assembly
- 12—Vehicle Surface
- 14—Light Assembly
- 16—Mirror Head
- 18—Mirror Base
- 20—First Gasket
- 22—Lens
- 23—Cavity
- 24—Reflector Body
- 26—Light Collector
- 28—PCB assembly
- 30—Lower PCB
- 32—Upper PCB
- 34—Second Gasket
- 36—Housing
- 38—Tab
- 40—First Light Sources
- 42—Second Light Source
- 44—Third Light Source
- 46—Biasing Element
- 48—First End
- 50—Indicia area
- 52—First Upper Channel
- 54—First Lower Channel
- 56—Second Upper Channel
- 58—Second Lower Channel
- 60—Reflector Element
- 62—Upper Light Output Area
- 64—Lower Light Output Area
- 70—Aperture
- 72—Aperture
- 84—First Upper Optics
- 86—First Lower Optics
- 88—Second Upper Optics
- 90—Second Lower Optics
- 92—Lens Inner Surface
- 94—Lens Outer Surface
- 100—First Pitch Optic Section
- 102—Second Pitch Optic Section
- 104—First Lens Optic
- 106—Second Lens Optic
- 108—Ground Target
- 110—Vertical Plane Target
- 112—Sloped Surface
- 114—Homogenizing Surface
- 200—Light Module
- 202—Light Collector 204—PCB
206—Screen
208—Housing
210—Light Source
A-A—Section Line
B-B—Section Line
C—Area for Enlargement
D—Depth
H—Height
L1—Light
L3—Light

The invention claimed is:

1. A light assembly for a vehicle comprising:
a housing;
a lens covering the housing;
a plurality of light sources disposed in the housing, wherein the plurality of light sources include at least one first light source, at least one second light source, and at least one third light source;
a reflector body mounted in the housing, wherein the reflector body includes a reflector element and different zones for each of the plurality of light sources, and wherein the reflector body comprises a first upper channel, a first lower channel, a second upper channel, and a second lower channel; and
a light collector located between the reflector body and the housing,
wherein light emitted by the at least one first light source is captured by the reflector element which reflects the light emitted by the at least one first light source towards the lens, the lens directing the light emitted by the at least one first light source generally downward towards a ground area when the light assembly is attached to the vehicle,
wherein light emitted by the at least one second light source is passed through an aperture in the reflector body without reflection of the emitted light,
wherein light emitted from the at least one third light source is captured by the reflector body which reflects and directs the light from the at least one third light source horizontally towards the lens with the lens directing the light from the at least one third light source generally horizontal, and
wherein the light collector captures and transmits the light emitted from at least one of the plurality of light sources.

2. The light assembly of claim 1, wherein the at least one first light source, the at least one second light source, and/or the at least one third light source is a point light source in form of a light emitting diode (LED).

3. The light assembly of claim 1, wherein the lens comprises at least one of:
a first group of surface optics to direct the light reflected from the at least one first light source towards the ground area, wherein the first group of surface optics of the lens comprises a first upper optic and a first lower optic, or
a second group of surface optics to homogenize the light reflected from the at least one third light source, wherein the second group of surface optics of the lens comprises a second upper optic and a second lower optic.

4. The light assembly of claim 1, wherein the optics of the lens are adapted to recess in the respective channels of the reflector body when the light assembly is assembled, such as to restrict the emitted light from spreading past the area defined by the channels of the reflector body.

5. The light assembly of claim 1, wherein the reflector body comprises further apertures located at the outboard end of each of the channels of the reflector body and being adapted to allow the at least one third light source to enter the optics of the lens.

6. The light assembly of claim 3, wherein
the first upper optic comprises at least two distinct pitch optics, comprising a first pitch optic section and a second pitch optic section.

7. The light assembly of claim 6, wherein the first pitch optic section is adapted to reflect lower power light emitted from the at least one third light source by containing a fine pitch optic.

8. The light assembly of claim 6, wherein the second pitch optic section is adapted to spread the higher power light emitted from the at least one third light source over a larger area by containing a coarse pitch optic.

9. The light assembly of claim 1, wherein the first upper channel of the reflector body is configured to have a depth, such as to restrict the light emitted by the at least one third light source from spreading upward and downward.

10. The light assembly of claim 9, wherein the channels of the reflector body are configured to each have the same height, such as to create a horizontal appearance to the light emitted by the ate least one third light source and an uniform light effect visible through the lens to mimic a light pipe though the lens.

11. The light assembly of claim 3, wherein the optics of the lens are of the same or different pitch optics, such as to achieve the same or a different light output for each area.

12. The light assembly of claim 1, wherein the channels of the reflector body are configured to each have a different parameters, such as to create different optical effects.

13. The light assembly of claim 1, wherein the light collector comprises at least one biasing element, adapted to provide a bias force on the light collector.

14. The light assembly of claim 13, wherein the biasing element comprises a first end adapted to make contact with the housing and to provide a biasing force such as to secure the light collector in position.

15. The light assembly of claim 1, wherein the light assembly further comprises a printed circuit board (PCB) or a PCB assembly.

16. The light assembly of claim 15, wherein the PCB assembly comprises a lower PCB and an upper PCB and is adapted to be mounted between the housing and the reflector body.

17. The light assembly of claim 16, wherein a geometry of the light collector is adapted to cooperate with the lower PCB, the upper PCB and the at least one second light source, such as to collect the light emitted by the at least one second light source.

18. The lighting assembly of claim 15, wherein the light collector is fastened within the light assembly to the PCB via at least one fastener or an adhesive.

19. The light assembly of claim 1, wherein the light collector is made from a tinted acrylic material.

20. The light assembly of claim 1, wherein the at least one second light source provides a turn signal indicator.

21. The light assembly of claim 20, wherein the light collector cooperates with the at least one second light source to produce an amber light color.

22. The light assembly of claim 1, wherein the at least one second light source provides a turn light signal and a hazard light signal.

23. The light assembly of claim 22, wherein the light collector is adapted to cooperate with the at least one second light source to produce dual colors.

24. The light assembly of claim 21, wherein a thickness of the light collector is determined by a color of the at least one second light source to produce a desired light color.

25. The light assembly of claim 23, wherein a thickness of the light collector is determined by a color of the at least one second light source to produce a desired light color.

26. The light assembly of claim 1, wherein the light collector further comprises an integral light pipe or optics to direct the light received from one of the at least one first, second and/or third light source.

27. The light assembly of claim 1, wherein more than one light collector is used for the at least one first, second and/or third light sources.

28. The light assembly of claim 1, further comprising:
one or more gasket to provide sealing against an ingress of fluids and/or containment for the light assembly.

29. The light assembly of claim 1, wherein the reflector body further comprises at least one indicia area being adapted to provide a location for a printed, integral or embossed logo or symbols on the reflector body.

30. A rearview device in form of a mirror assembly for a vehicle comprising at least one light assembly of claim 1.

31. The rearview device according to claim 30, further comprising:
a head attached to a base adapted to be mounted to the vehicle.

32. The rearview device of claim 31, wherein the housing provides for mounting the light assembly to the head of the rearview device via at least one tab and/or at least one fastener.

33. The rearview device of claim 31, wherein at least one further light assembly is mounted to the mirror head or the mirror base.

34. The rearview device of claim 31, wherein the rearview device includes a breakaway, a powerfold and/or a telescoping function.

35. A vehicle with at least one light assembly of claim 1.

36. A vehicle with at least one rearview device of claim 30.

37. The vehicle of claim 35, wherein the at least one first light source, the at least one second light source and the at least one third light source are adapted to be activated from the vehicle interior via a switch and/or a HMI input, and/or from the vehicle exterior via a switch, a HMI input, the rearview device, a key forb and/or a mobile device.

38. A light assembly for a vehicle comprising:
a housing;
a lens covering the housing;
a plurality of light sources disposed in the housing, wherein the plurality of light sources include at least one first light source, at least one second light source, and at least one third light source;
a reflector body mounted in the housing, wherein the reflector body includes a reflector element and different zones for each of the plurality of light sources;
a light collector located between the reflector body and the housing; and
a PCB assembly comprising a lower PCB and an upper PCB and, wherein the PCB assembly is adapted to be mounted between the housing and the reflector body;
wherein light emitted by the at least one first light source is captured by the reflector element which reflects the light emitted by the at least one first light source towards the lens, the lens directing the light emitted by the at least one first light source generally downward towards a ground area when the light assembly is attached to the vehicle,
wherein light emitted by the at least one second light source is passed through an aperture in the reflector body without reflection of the emitted light,
wherein light emitted from the at least one third light source is captured by the reflector body which reflects and directs the light from the at least one third light source horizontally towards the lens with the lens directing the light from the at least one third light source generally horizontal,
wherein the light collector captures and transmits the light emitted from at least one of the plurality of light sources, and
wherein a geometry of the light collector is adapted to cooperate with the lower PCB, the upper PCB and the at least one second light source, such as to collect the light emitted by the at least one second light source.

39. The lighting assembly of claim 38, wherein the light collector is fastened within the light assembly to the PCB via at least one fastener or an adhesive.

* * * * *